United States Patent [19]
Griffin

[11] 3,945,262
[45] Mar. 23, 1976

[54] DRIVE FOR FEED ROLLS

[75] Inventor: Charles De Witt Griffin, Wilmington, Del.

[73] Assignee: E. I. Du Pont de Nemours and Company, Wilmington, Del.

[22] Filed: Oct. 29, 1974

[21] Appl. No.: 518,870

[52] U.S. Cl. .............................. 74/219; 74/242.1 A
[51] Int. Cl.² ...................... F16H 7/00; F16H 7/12
[58] Field of Search ............ 74/242.15 R, 219, 380, 74/242.1 A

[56] References Cited
UNITED STATES PATENTS 3,380,313  4/1968  Bulin ...................... 74/242.15 R X
3,464,282  9/1969  Grobowski ............... 74/242.15 R X

*Primary Examiner*—Leonard H. Gerin

[57] ABSTRACT

A drive assembly for first and second rolls in a roll laminator includes sprocket wheels affixed to each roll, a driven sprocket wheel, a first idler sprocket wheel rotatable about an axis, an endless drive element trained over the sprocket wheels, and a lever rotatably mounted on the axis of the first idler sprocket wheel. The first roll is carried by the lever for swinging movement toward and away from the second roll. The drive assembly is improved by the addition of a second idler sprocket wheel closely adjacent the first idler sprocket wheel, with the endless drive element also trained over the second wheel.

3 Claims, 4 Drawing Figures

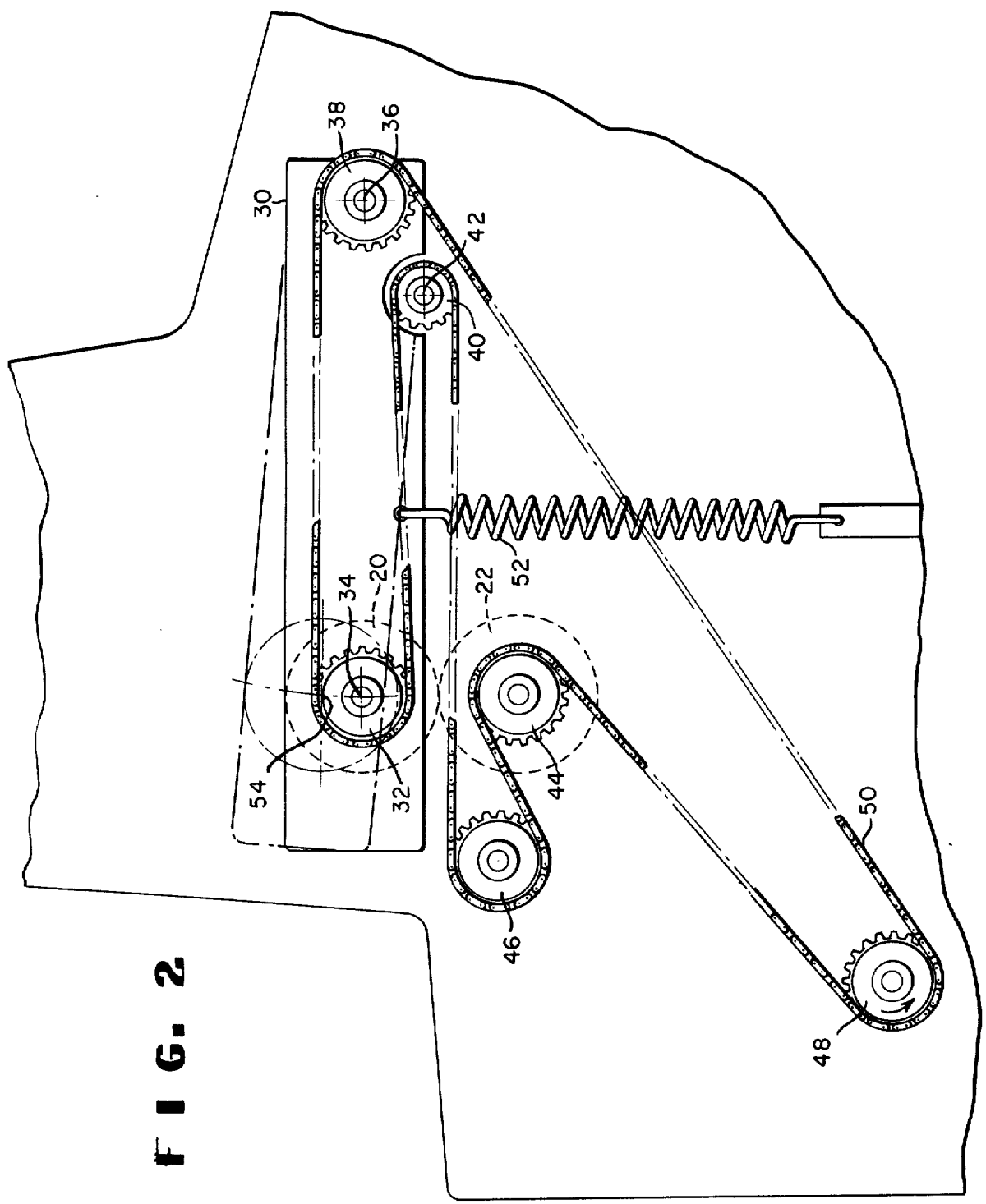

3,945,262

DRIVE FOR FEED ROLLS

BACKGROUND OF THE INVENTION

1. Field of the Invention

The present invention relates to a drive assembly for rolls in a roll laminator, with at least one of the rolls being displaceable. More particularly, the drive assembly includes an endless driving element and several idler sprocket wheels, with one of the idler sprocket wheels positioned to enable the endless drive element to maintain a substantially constant path length as the displaceable roll is moved upward.

2. Description of the Prior Art

Feed roll apparatus driven by a chain, utilizing idler sprockets and having displaceable rolls is known to the art. This type of apparatus has the disadvantage of requiring the use of a second chain to drive the displaceable roll and/or having to provide substantial slack in the chain to allow for movement of the roll and including a tensioning device to compensate for the slack (U.S. Pat. No. 3,272,026 to J. K. Hale). What is needed is an assembly in which the roll is displaceable without the need for a second chain or a tensioning device.

SUMMARY OF THE INVENTION

The present invention provides such an assembly which includes first and second rolls each having a wheel affixed. The assembly also includes a rotatably driven wheel, a first idler wheel rotatable about an axis, an endless driving element trained over the wheels, and a lever rotatably mounted on the axis of the first idler wheel. The first roll is carried by the lever for swinging movement toward and away from the second roll. The apparatus is improved by the inclusion of a second idler wheel immediately adjacent the first idler wheel. The endless driving element is trained over the second wheel.

In a preferred embodiment of the above assembly, there is included a third idler wheel having trained thereover the portion of the endless driving element extending between the second idler wheel and the wheel affixed to the first roll.

In other embodiments both upper and lower rolls are carried by levers for swinging movement toward and away from each other.

BRIEF DESCRIPTION OF THE DRAWINGS

FIG. 2 is a fragmentary end view of the left side of the roll laminator of FIG. 1 with the cover assembly removed, showing the improved drive assembly of the present invention.

DESCRIPTION OF THE PREFERRED EMBODIMENTS

Figure 1:
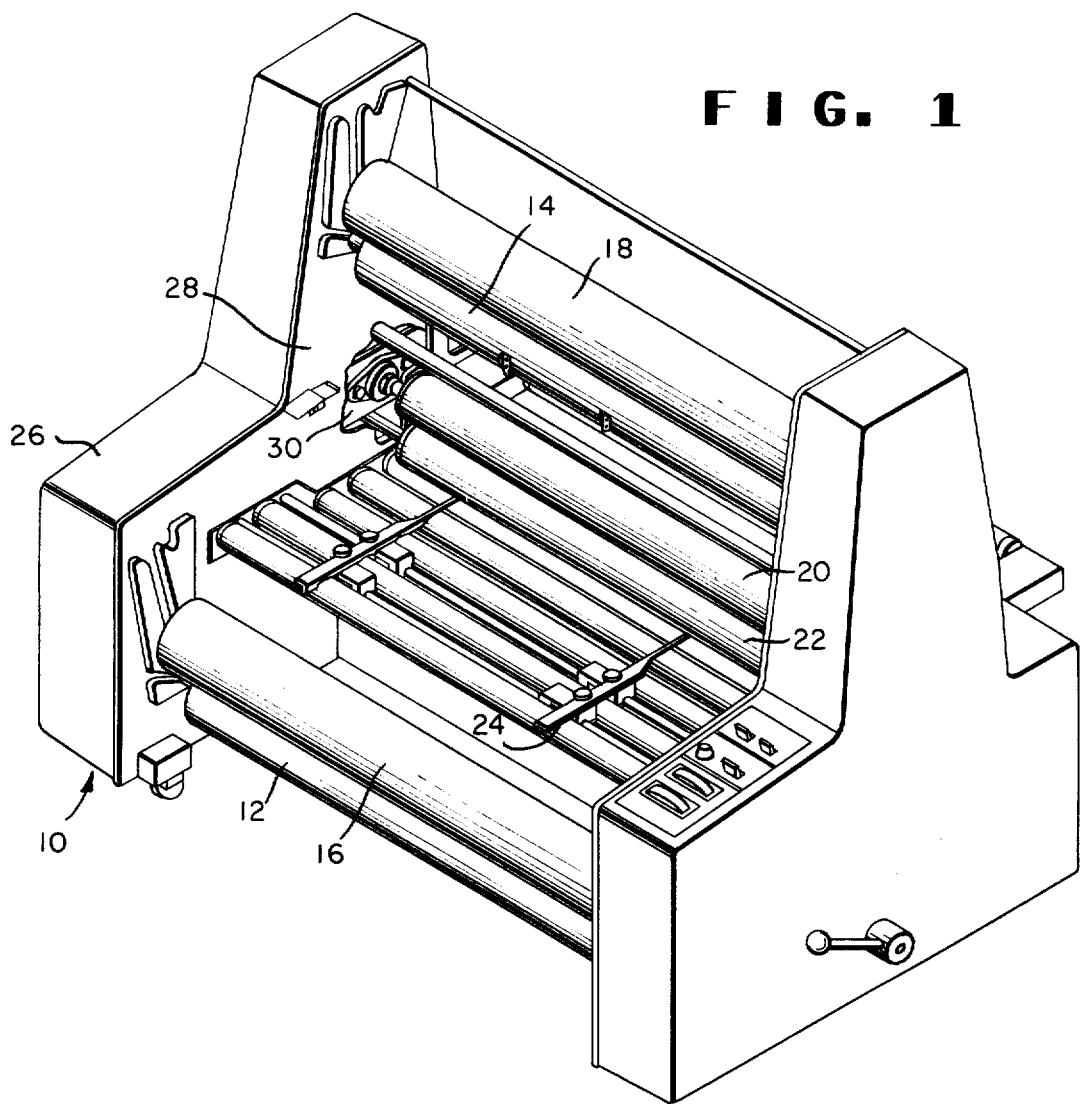
FIG. 1 is a perspective view of a roll laminator.

A roll laminator for use with photopolymer film resist is shown in FIG. 1. The film resist is typically laminated to one or both sides of copper clad insulating boards used in the manufacture of printed circuit boards or for chemical machining. The film resist has a polyester sheet covering one surface and a polyolefin separator sheet covering the other surface. The polyolefin separator sheet is removed prior to the lamination of the film resist to the insulating boards. The roll laminator is designated 10 and has upper and lower supply mandrels 12, 14 respectively which hold rolls of the film resist. Associated with upper and lower supply mandrels 12, 14 are take-up rolls 16, 18 respectively, which receive the polyolefin separator sheet as it is stripped from the film resist prior to the laminating process. A pair of electrically heated rolls, upper roll 20 and lower roll 22, are positioned adjacent to one another to form a pinch point between which the film resist from both the upper and lower supply mandrels 12, 14 is fed. Also fed into the pinch point between the two film resists is the copper clad insulated board which is guided to the pinch point by feed guide 24. The laminating process takes place at the pinch point. A cover assembly 26 at one end of roll laminator 10 covers the drive mechanism for upper and lower rolls 20, 22. A support plate 28 is cut away toward the rear of cover assembly 26 to expose a portion of the drive mechanism which forms the basis of the present invention. The cutaway portion of support plate 28 exposes, as a part of the drive mechanism, a lever 30 which has upper roll 20 rotatably mounted at one end.

FIG. 2 shows a first sprocket wheel 32, with an axis 34, fixedly mounted to the end of first upper roll 20. The upper roll 20 is rotatably mounted at the end of lever 30. The other end of lever 30 is pivotably mounted about an axis 36 around which a first idler sprocket wheel 38 is also rotatably mounted. A second idler sprocket wheel 40 is rotatably mounted about an axis 42, and is closely adjacent to first idler sprocket wheel 38. A second sprocket wheel 44 is fixedly mounted at the end of the second lower roll 22 and a third idler sprocket wheel 46 is rotatably mounted in the proximity of second sprocket wheel 44. A rotatably mounted driven sprocket wheel 48 is below lower roll 22. An endless drive element, chain 50, is trained over all of the above-mentioned sprocket wheels with the third idler sprocket wheel 46 positioned to reverse the direction of travel of endless drive element 50 over second sprocket wheel 44. A spring 52 is fixed to lever 30 to provide a downward bias. Upper roll 20 is rotatably mounted to one end of lever 30 to allow for displacement of the roll upward in an arc when there are changes in thickness of the photopolymer film resist and/or insulating boards passing through the pinch point between upper and lower rolls 20, 22. The arc has its center of curvature at axis 36. Upper roll 20 and lever 30 are shown in phantom in a displaced position and the axis 34 of first sprocket wheel 32 becomes a new axis 54.

Figure 3:
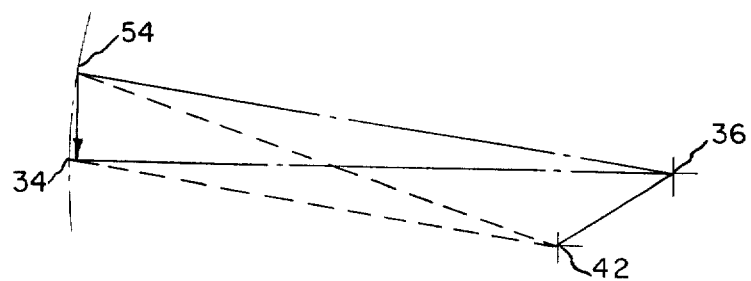
FIG. 3 is a diagrammatic view of the geometric relationship in FIG. 2 of the displaceable upper roll with respect to the first andd second idler sprocket wheels, with the displaceable upper roll in both its normal and displaced positions.

FIG. 3 shows the geometric relationship of the axes, 36 of first idler sprocket wheel 38, 42 of second idler sprocket wheel 40, and 34 of first sprocket wheel 32. The axis 54 of first sprocket wheel 32 in the displaced position shown in phantom in FIG. 2 is also shown. The distance from axis 36 to axis 34 (and 54) and from axis 34 (and 54) to axis 42 approximates the lengths of the chain segments extending between first sprocket wheel 32, first idler sprocket wheel 38, and second idler sprocket wheel 40. Lines 34–36 and 54–36 represent the distances (and approximate chain lengths) between axis 36 of first idler sprocket wheel 38 and axis 34 (and 54) of upper roll 20 in its normal and displaced positions. These distances are equal. Dotted lines 34–42 and 54–42 indicate distances (and approximate chain lengths) between axis 42 of second idler sprocket wheel 40 and axis 34 (54) of upper roll 20 in its normal and displaced positions. These distances are not equal. Line 42–36 represents the distance between axis 36 of first idler sprocket 38 and axis 42 of second idler sprocket 40. The distance represented by line 42-36 should be a small fraction of the distance represented by line 34-36 or 54-36. The fraction may vary with the parameters of different mechanical drive systems.

Figure 4:
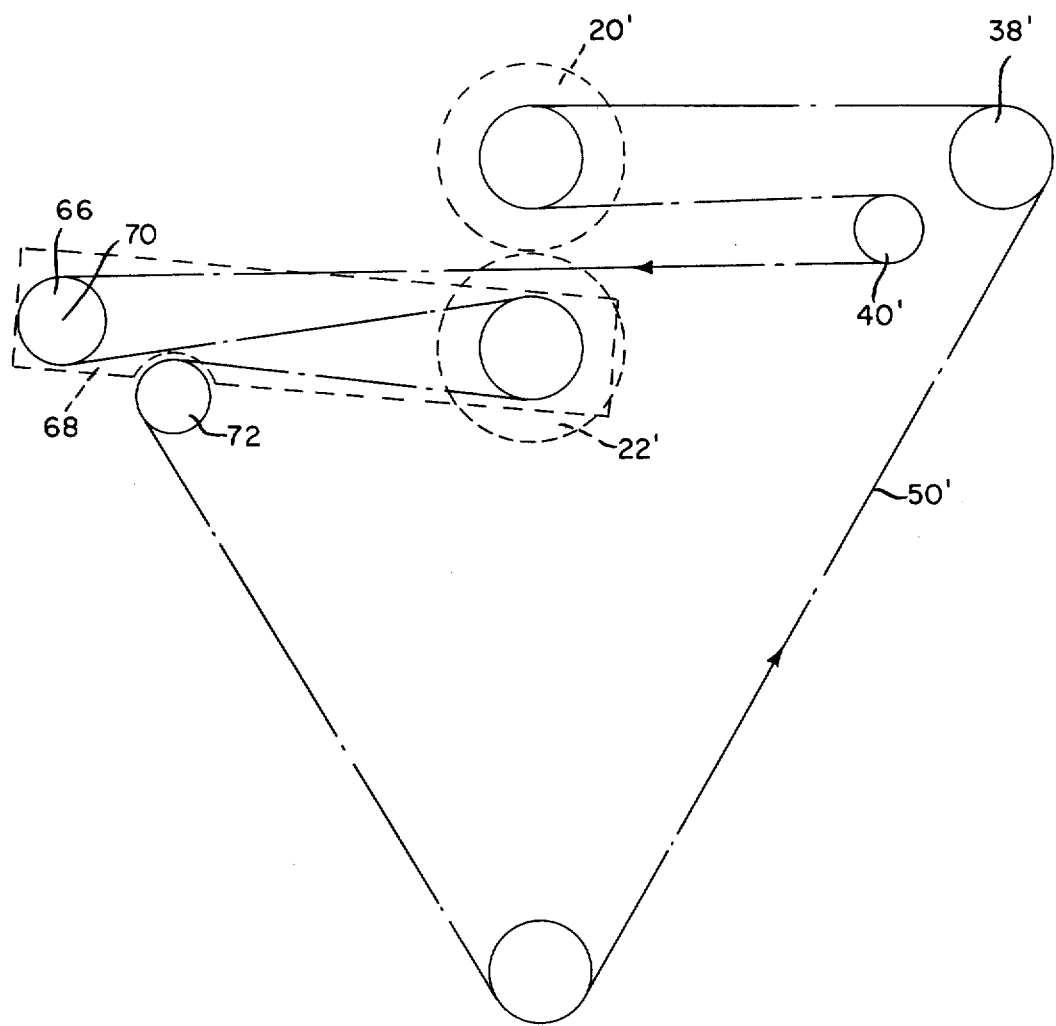
FIG. 4 is a schematic view of a drive assembly for a pair of rolls both of which are displaceable.

FIG. 4 is an alternative embodiment of the drive assembly of FIG. 1 in which both an upper roll 20' and a lower roll 22' are displaceable. The drive assembly of FIG. 4 is similar to that described in connection with FIG. 2 with several exceptions. The third idler sprocket wheel 46 of FIG. 2 is replaced in FIG. 4 with a fourth idler sprocket wheel 66 which is moved a substantial distance away from lower roll 22'. The lower roll 22' is rotatably mounted on a lever 68 so as to be displaceable downward along an arc whose center of curvature is at axis 70 of fourth idler sprocket wheel 66. Lever 68 is pivotably mounted about axis 70. Finally a fifth idler sprocket 72 has been added and positioned immediately adjacent fourth idler sprocket wheel 66 in the same manner that first and second idler sprocket wheels 38' and 40' have been positioned. Endless chain 50' is trained over all of the above-mentioned wheels.

In operation of the preferred apparatus of FIG. 2, two sheets of film resist with the insulated board therebetween are inserted into the pinch point between upper roll 20 and lower roll 22. To accommodate varying thicknesses of film resist and insulated boards, upper roll 20 is free to separate from lower roll 22 and be displaced to a new position as for example the position represented in phantom in FIG. 2. When upper roll 20 is displaced to the raised position the length of the endless drive element 50 between first sprocket wheel 32 of upper roll 20 and first idler sprocket wheel 38 does not change as is seen from lines 34-36 and 54-36 in FIG. 3. The length of the endless drive element 50 between first sprocket wheel 32 and second idler sprocket wheel 40, however, changes a small amount as is seen by the difference between lines 34-42 and 54-42. The difference in lines 34-42 and 54-42 indicates how much the path length of endless drive element 50 must be increased to allow upper roll 20 to be displaced upwardly. By positioning second idler sprocket wheel 40 immediately adjacent first idler sprocket 38 and hence near the center of curvature of the arc traversed by upper roll 20, the difference in the path length of endless drive element 50 as indicated by lines 34-42, 54-42 is minimized. This allows upper roll 20 to traverse its arc with a minimum amount of effect on the length of the path of endless drive element 50 and hence on its tension. Endless drive element 50 has a certain amount of permissible slack which is the extra endless drive element 50 path length which may be used when upper roll 20 is displaced. The amount of permissible slack must be greater than the amount of path length increase for endless drive element 50.

The positioning of second idler sprocket wheel 40 closely adjacent first idler sprocket wheel 38 to minimize the increase in path length of endless drive element 50 as upper roll 20 is displaced upwardly has three major advantages. It enables the roll drive assembly to operate with one chain and not require the use of a second chain to individually drive upper feed roll 20. In addition there is no need to use a spring biased chain tensioning system to provide for a substantial amount of chain slack. Furthermore the direction of rolls 20, 22 and endless drive element 50 can be reversed without loss of power or substantial backlash regardless of the position of displaceable roll 20. This permits withdrawal of material from between rolls 20, 22 in the case of a malfunction.

In the embodiment shown in FIG. 4 with both upper and lower rolls 20', 22' displaceable, the fourth and fifth idler sprocket wheels 66, 72 are positioned in the same relationship as first and second idler sprocket wheels 38', 40' and both sets of sprocket wheels operate in the same way to allow upper and lower rolls 20', 22' to be displaced with only a minimum of change in the path length of endless drive element 50'.

What is claimed is:

1. A drive assembly for first and second rolls each having a drive wheel attached for driving its associated roller, said drive assembly including:
   a first idler wheel having a fixed axis of rotation,
   means for maintaining a substantially constant spacing between said first idler wheel and said first roll, said first roll being movable toward and away from said second roll,
   a second idler wheel having a second fixed axis of rotation contiguous said first axis of rotation, and
   an endless driving element trained over said wheels, whereby the driving element length between said first roll and each of said first and second idler wheels remains substantially constant.

2. A drive assembly according to claim 1 wherein said means for maintaining a constant spacing is a lever pivotable about said first idler wheel fixed axis of rotation.

3. A drive assembly according to claim 2 wherein said elements between said first roll and each of said first and second idlers are substantially parallel.

* * * * *